United States Patent
Noguchi et al.

(10) Patent No.: US 7,726,767 B2
(45) Date of Patent: Jun. 1, 2010

(54) IMAGE PROCESSING METHOD AND INK JET PRINTING APPARATUS

(75) Inventors: Eri Noguchi, Yokohama (JP); Tsuyoshi Shibata, Yokohama (JP); Hiromitsu Yamaguchi, Yokohama (JP); Takashi Ochiai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 11/762,460

(22) Filed: Jun. 13, 2007

(65) Prior Publication Data

US 2007/0291062 A1  Dec. 20, 2007

(30) Foreign Application Priority Data

Jun. 20, 2006  (JP) .............................. 2006-170462

(51) Int. Cl.
    B41J 29/393  (2006.01)
(52) U.S. Cl. .............................. 347/19; 347/41; 347/15
(58) Field of Classification Search .................. 347/15, 347/41, 43, 19, 40
    See application file for complete search history.

(56) References Cited

U.S. PATENT DOCUMENTS

| 6,805,422 | B2 | 10/2004 | Takahashi et al. |
| 6,834,927 | B2 | 12/2004 | Yashima et al. |
| 6,874,864 | B1 * | 4/2005 | Maeda et al. ................. 347/41 |
| 7,237,871 | B2 | 7/2007 | Yamaguchi et al. |
| 7,278,700 | B2 | 10/2007 | Yamaguchi et al. |
| 2007/0285451 | A1 | 12/2007 | Noguchi |
| 2008/0049057 | A1 | 2/2008 | Ochiai et al. |
| 2008/0136855 | A1 | 6/2008 | Ochiai et al. |

FOREIGN PATENT DOCUMENTS

| JP | 8-025693 | 1/1996 |
| JP | 2002-036524 | 2/2002 |

* cited by examiner

Primary Examiner—Lamson D Nguyen
(74) Attorney, Agent, or Firm—Fitzpatrick, Cella, Harper & Scinto

(57) ABSTRACT

There is provided an ink jet printing apparatus capable of printing an image having few joining stripes. Dot count is performed regarding an image printed in the vicinity of the joining stripe, and print duty is judged. Next, a dot count value is determined from the print duty. Then, a print data correction rank is determined beforehand in accordance with properties of the printing apparatus, and image data to be printed in the vicinity of the joining stripe is added or thinned out. Thus, an image can be printed which has few black and white stripes.

6 Claims, 20 Drawing Sheets

IMAGE PROCESSING METHOD AND INK JET PRINTING APPARATUS

BACKGROUND OF THE INVENTION

1. Field of the Invention

The present invention relates to an image processing method and an ink jet printing apparatus, more particularly, it relates to an image processing method and ink jet printing apparatus for performing image processing for reducing a joining stripe caused by scans of a printing head in image printing.

2. Description of the Related Art

Recently, the need for high speed printing has increased in printing to a print medium by a printing apparatus. In an ink jet printing apparatus for printing by ejecting ink droplets, in order to print one line of dots constituting an image, a multi-pass printing method is employed for printing by making a printing head scan to a line a plurality of times.

The multi-pass printing method has an advantage that high image quality printing can be realized. However, in order to realize high speed printing, it is effective to reduce the number of passes that is the number of scans of a carriage necessary for completion of printing for one line. That is, since a paper conveyance amount per one time becomes small as the number of passes becomes large, the printing speed per one line is decreased. On the other hand, since the paper conveyance amount per one time becomes large as the number of passes becomes small, the printing speed per one line is increased. For example, comparing four-pass printing with two-pass printing, about two times the speed is realized if two-pass printing instead of four-pass printing is performed. Accordingly, as the number of passes becomes small, the number of scans of the carriage required for printing to a predetermined region of a piece of print paper or the like is decreased, and the paper conveyance amount per one time becomes large, and consequently a time required for a predetermined printing is shortened.

In the multi-pass printing method, since printing is performed to a region for one band, which is a band-shaped image region, by multiple scanning, a joining stripe is likely to be caused at a joining part between the bands.

FIG. 1 is a view showing an image region in which the two-pass printing is performed. In the ink jet printing apparatus, the carriage scans in a direction orthogonal to an arrangement direction of ink ejecting ports so that printing is performed, and thus a band-shaped image print region is formed every scanning. When printing is performed on the print medium, for example, plain paper on which ink easily bleeds, a black joining stripe caused by the bleeding of the ink at the joining part between the bands can be visually checked although the degrees of the stripes are different from each other depending on the properties of ink droplets or print mediums. In particular, when the number of passes is reduced and printing is performed, a clear joining stripe can be visually checked, and print quality is lowered. That is, the number of dots to be printed on the print medium by the scanning in two-pass printing becomes about twice that in four-pass printing, and consequently duty, which is the rate of dots to the region, also becomes approximately twice. Therefore, a clearer black joining stripe can be visually checked as the number of passes becomes smaller.

As a method for realizing a high image quality by removing the black joining stripe, a method disclosed in Japanese Patent Laid-Open No. 2002-036524 is conventionally known that printing is performed per a band by repeating main scans of the printing head, and that print data is subjected to a thinning-out processing corresponding to a print amount of a region in the vicinity of the joining part. More specifically, dots printed on the region in the vicinity of the joining part are counted, and the thinning-out processing is performed corresponding to the counted value.

Additionally, in Japanese Patent Laid-Open No. 8-025693 (1996), it is disclosed that the joining stripe is reduced in a one-pass printing method for printing to a certain region by making the carriage scan only once. That is, a printing method is disclosed that images to be each printed by scanning are partly overlapped with each other, and complement the overlapped region by a random mask pattern between scanning.

However, the conventional method disclosed in Japanese Patent Laid-Open No. 2002-036524, is applicable to the case where the joining stripe is black, but not applicable to the case where the joining stripe is white. The joining stripe is caused by low precision of the paper conveyance, end nozzle dot deflection or the like unique to the printing apparatus in addition to the ink bleed, and the white joining stripe is sometimes caused at the joining part. However, the conventional method cannot solve the above problem. Here, the end nozzle dot deflection indicates a phenomenon that ink droplets landing position by a nozzle arranged on both ends of a plurality of arranged nozzles deviate toward a center axis of the printing head. Regarding the end nozzle dot deflection phenomenon, it is observed that the deflection of the landing position of the ink droplets is large as the duty in each scanning is high, or the size of the ink droplets is small. In particular, when the ink droplets are not more than 2.8 pl, the end nozzle dot deflection becomes large. Accordingly, the end nozzle dot deflection becomes large in the two-pass printing since duty of ink in the two-pass printing is larger than that in the four-pass printing. Thus, the white joining stripe is likely to occur at the joining part between the bands. In particular, a clear white joining stripe can be visually checked on a print medium such as photo-paper on which the ink hardly bleeds, and the image quality is lowered.

Additionally, in the conventional methods disclosed in Japanese Patent Laid-Open Nos. 2002-036524 and 8-025693 (1996), image data for the nozzles is corrected, the nozzles being arranged at both ends of the nozzle arrangement line. In this case, since the ink droplets ejected from the nozzles arranged at both ends are affected by the end nozzle dot deflection, a desired correction is hardly applied to the image data, and the joining stripe is not always reduced. In particular, such precision is insufficient for printed images such as photographs and graphics for which a high quality image is required.

SUMMARY OF THE INVENTION

In view of the above problems, the present invention was carried out, and it is an object of the present invention to provide an image processing method and ink jet printing apparatus for reducing a joining stripe and capable of obtaining an excellent printed image in printing an image by repeating a main scanning. More specifically, the present invention aims at providing an image processing method and ink jet printing apparatus for reducing the joining stripe and capable of obtaining an excellent printed image even by a one-pass printing method or multi-pass printing method using a small number of passes.

In order to achieve the above object, in the present invention, an image processing method for generating print data for an ink jet printing apparatus which performs printing by making a printing head having a plurality of nozzles for ejecting ink scan a print medium, and ejecting an ink droplet from the printing head onto the print medium so that the ink droplet forms into a dot, said method comprising: a step of calculating duty of dots from print data for nozzles corresponding to a predetermined vicinity of a boundary between image print regions adjacent to each other in print data of each of two scans forming the adjacent image print regions; and, a step of correcting print data for nozzles other than the nozzles corresponding to the predetermined vicinity of the boundary in print data in either of the two scans, or scanning other than the two scans, and adding or thinning out a dot, corresponding to the calculated duty of dots.

According to the above constitution, since the dots on the print region are counted so that the image processing is performed for increasing or decreasing image density of the joining part, an excellent printed image having few joining stripes can be constantly obtained even by the one-pass printing method or the multi-pass printing method using the small number of passes.

Further features of the present invention will become apparent from the following description of exemplary embodiments (with reference to the attached drawings).

DESCRIPTION OF THE EMBODIMENTS

Embodiments of the present invention will be described below with reference to the accompanying drawings.

First Embodiment

Figure 1:
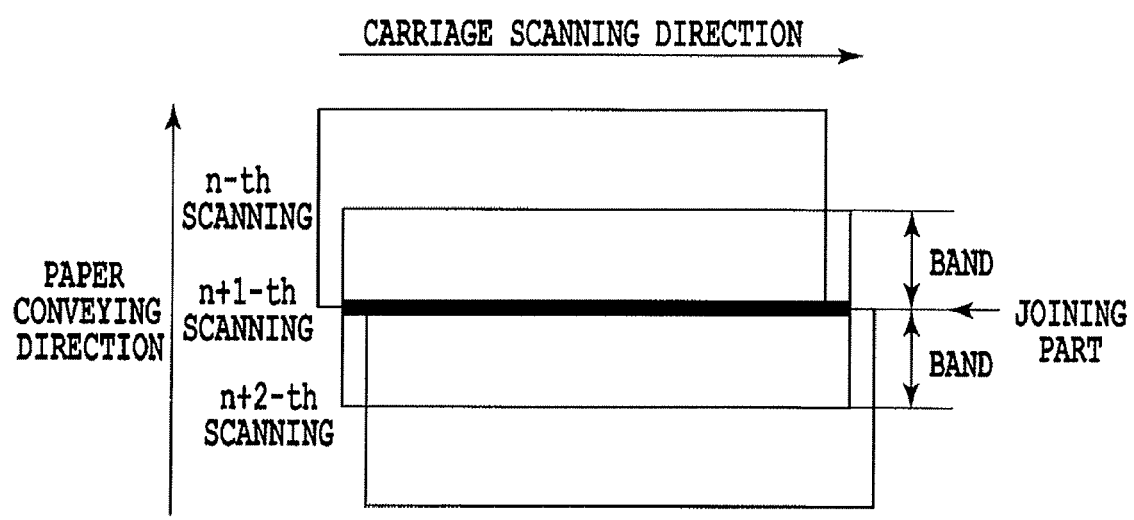
FIG. 1 is a view showing an image region in the case of performing two-pass printing.
Figure 2:
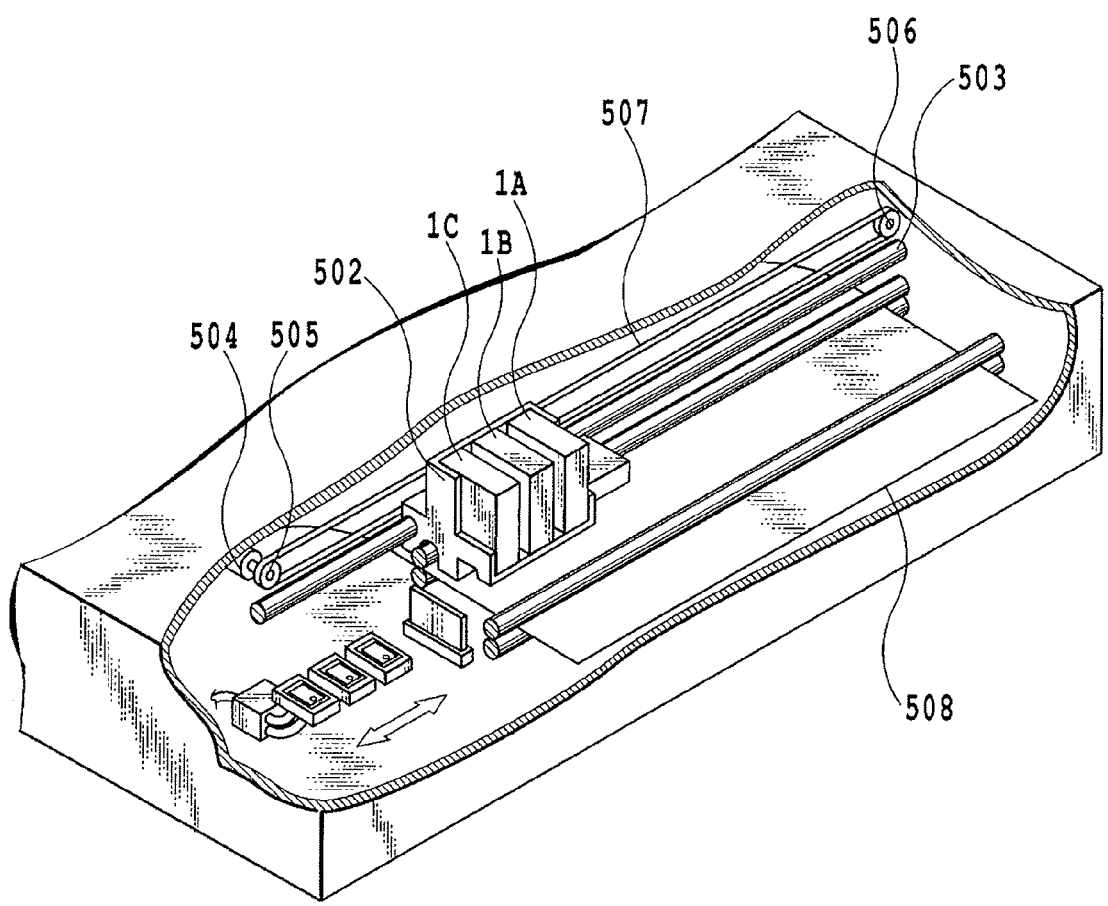
FIG. 2 is a perspective view of an ink jet printing apparatus according to a first embodiment of the present invention.

FIG. 2 is a perspective view of an ink jet printing apparatus according to an embodiment of the present invention. The reference symbols 1A, 1B and 1C each denotes an ink cartridge, and 502 denotes a carriage. The ink cartridges 1A to 1C and a printing head for ejecting ink (not shown) are detachably mounted on the carriage 502. The printing head has electro-thermo converters, generates thermal energy with the electro-thermo converters, and ejects the ink from an ink ejecting port. That is, the ink is ejected from the ink ejecting port, and printing is performed, with use of pressure variations generated owing to the growth and contraction of bubbles by film boiling generated by the thermal energy applied from the electro-thermo converter.

The ink cartridges 1A to 1C respectively have ink tanks different in each color, and is contained ink of, for example, cyan, magenta and yellow. The carriage 502 includes a connector holder (not shown) for transmitting a driving signal to the printing head. Additionally, the carriage 502 is driven via a motor pulley 505, a driven pulley 506 and a timing belt 507, and reciprocates along a guide shaft 503 by a main scanning motor 504, the guide shaft being provided in a main scanning direction. A print medium 508 such as print paper or a plastic thin plate is supported by a platen (not shown) so as to form a flat print surface relative to the ink ejecting port provided in the printing head, and carried to a position opposite to an ejecting port surface of the printing head by rotation of two sets of carriage rollers.

Figure 3:
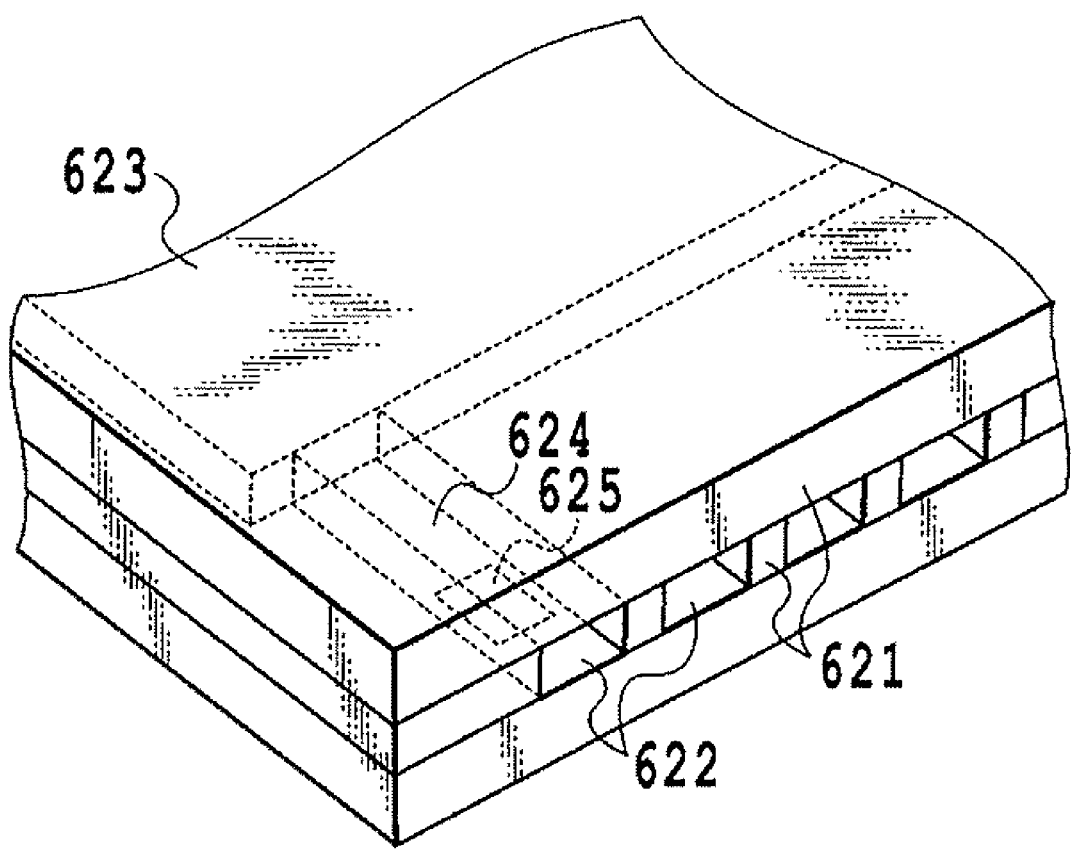
FIG. 3 is a schematic view of a printing head used for the ink jet printing apparatus shown in FIG. 2.

FIG. 3 is a schematic view of the printing head used for the ink jet printing apparatus shown in FIG. 2. The printing head includes an ink ejecting port 621 which is opposite to the print medium 508 at a predetermined interval of about 0.5 to 2 mm. 512 nozzles 622 are provided at a pitch corresponding to 2400 dpi in the ink ejecting port. Inside of the printing head, an electro-thermo converter 625 such as an exothermic resistor for generating energy for ink ejecting is arranged along a wall surface of each flow path 624 communicating a common liquid chamber 623 with each ejecting port of the nozzle 622.

Figure 4:
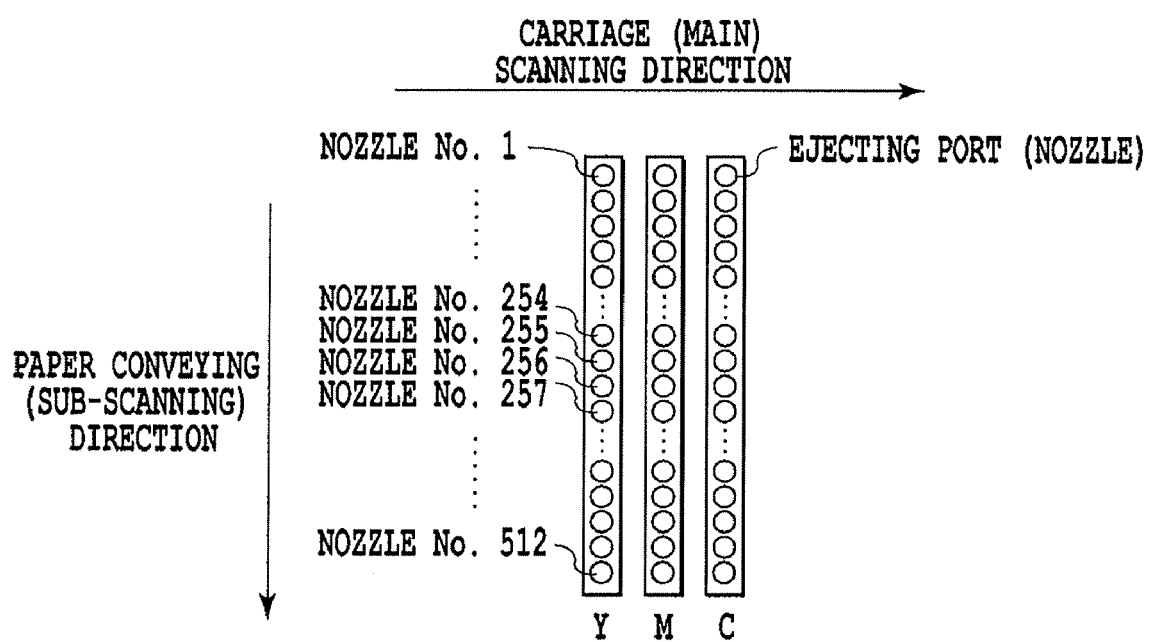
FIG. 4 is a view showing nozzle lines of the printing head of the first embodiment of the present invention.

FIG. 4 is a view of the printing head, which is shown in FIG. 2 and FIG. 3, viewed from the side opposite to the print medium. The 512 nozzles for ejecting ink are arranged in a sub-scanning direction, and the nozzle lines of yellow (Y), magenta (M), and cyan (C) are arranged in this order in the main scanning direction, in a surface opposite to the print medium. In the embodiment, numbers 1 to 512 are assigned to the nozzles arranged in the sub-scanning direction.

Figure 5:
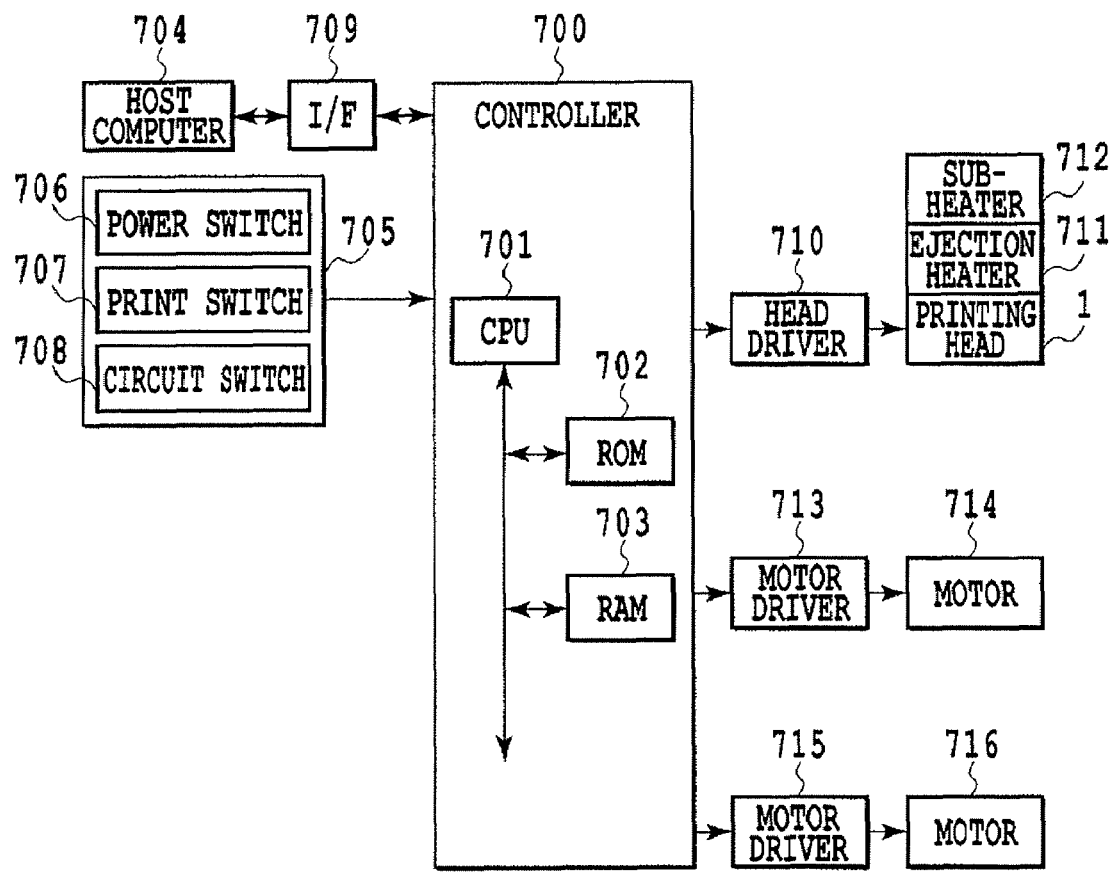
FIG. 5 is a block diagram illustrating a control circuit used for the ink jet printing apparatus according to the first embodiment of the present invention.

FIG. 5 is a block diagram illustrating a control circuit used for the ink jet printing apparatus shown in FIG. 2. A controller 700, which is a main controlling part, includes: a CPU 701 having a microcomputer form; a ROM 702 in which a fixed data such as a program and a predetermined table is stored; and a RAM 703 in which a region for developing image data and a working region are provided. Additionally, the controller 700 performs image processing such as addition or thinning-out processing of print data described below. A host unit 704 is a computer for performing creation and processing of image data, and also a supply source of image data such as a reader for image reading. Commands and status signals, etc., of the image data, are transmitted/received to/from the controller 700 via an interface 709.

The reference numeral 705 denotes an operating part constituted by a switch group for receiving instructions inputted from an operator, and includes: a power switch 706; a switch for issuing an instruction of starting printing; a switch 708 for issuing an instruction of starting suction recovery; and the like.

The reference numeral 710 denotes a head driver, and is a driver for driving an ejection heater 711 of a printing head 1 depending on the print data, etc. The head driver 710 has a shift register for making the print data correspond to a position of the ejection heater 711 and aligning the print data, and a latch circuit for latching the print data at a proper timing. Further, the head driver 710 includes: logic circuit elements for running the ejection heater in synchronization with a driving timing signal; a timing setting part for properly setting a driving timing (ejecting timing) for dot formation positioning; and the like.

A sub-heater 712 is provided on the printing head 1. The sub-heater 712 performs temperature adjustment for stabilizing an ejecting property of the ink. The sub-heater 712 may be formed on the ejection heater 711 and a substrate of the printing head, or attached to a printing head body or a printing head cartridge.

The reference numerals 713 and 715 each denotes a motor driver, and drive a main scanning motor 714 and a sub-scanning motor 716 respectively.

Figure 6:
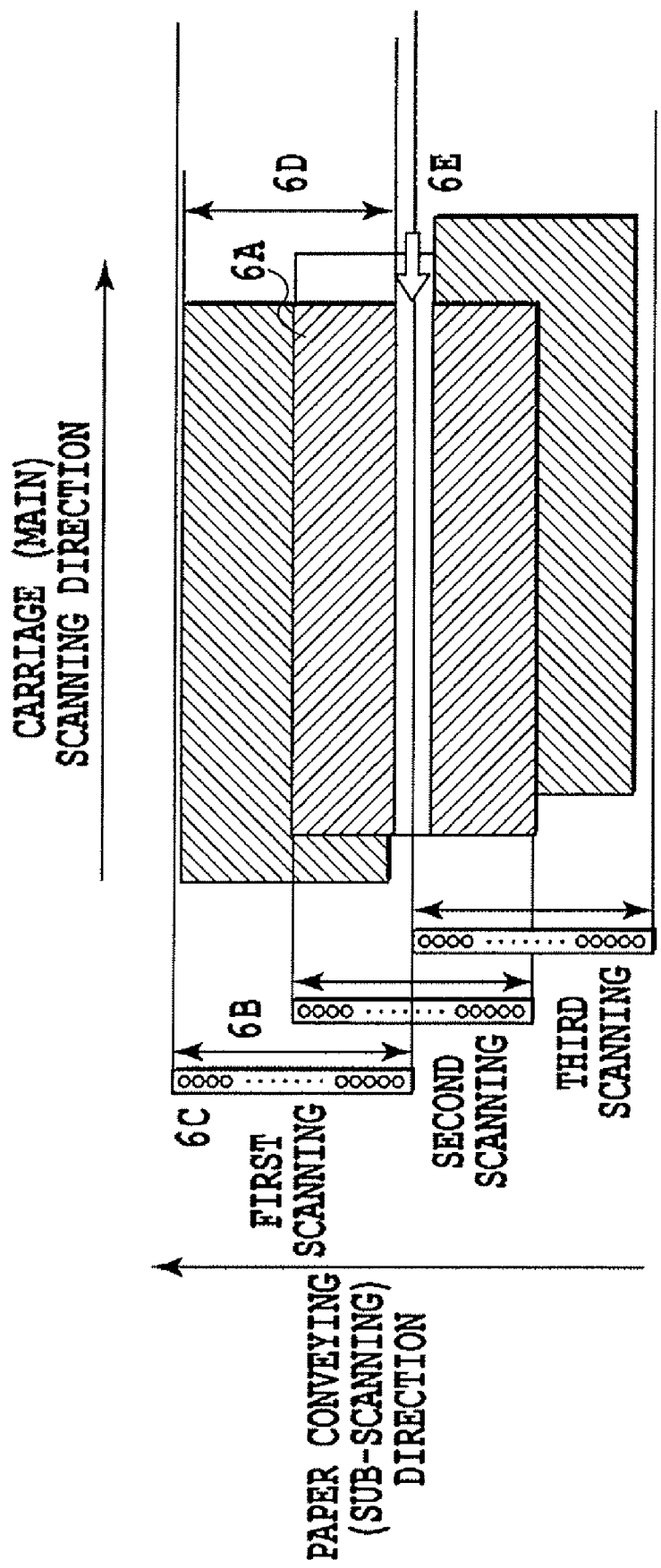
FIG. 6 is a view showing an image region in the case of performing the two-pass printing in the first embodiment of the present invention.

FIG. 6 is a view showing a white joining stripe in the case where printing is performed with an ink jet printing apparatus for printing by two-pass printing. A region 6A indicates a region in which an image is formed by two scans. When print duty of the region is 100%, print duty of each main scanning is about 50% if the print data is distributed to each main scanning by a random mask.

The reference symbol 6B indicates a paper conveyance amount, and the paper conveyance amount is equal to the length of a printing head 6C and fixed. The printing head used for the embodiment includes the 512 nozzles at the pitch corresponding to 2400 dpi, and the jet amount is about 1.5 pl. Here, a print width 6D actually printed is shorter than the paper conveyance amount by 20 μm due to the end nozzle dot deflection of the ejecting ports at both ends, and a joining stripe 6E becomes a white stripe having a width of 20 μm. The white stripe corresponds to about two pixels in the pitch corresponding to 2400 dpi.

Figure 7:
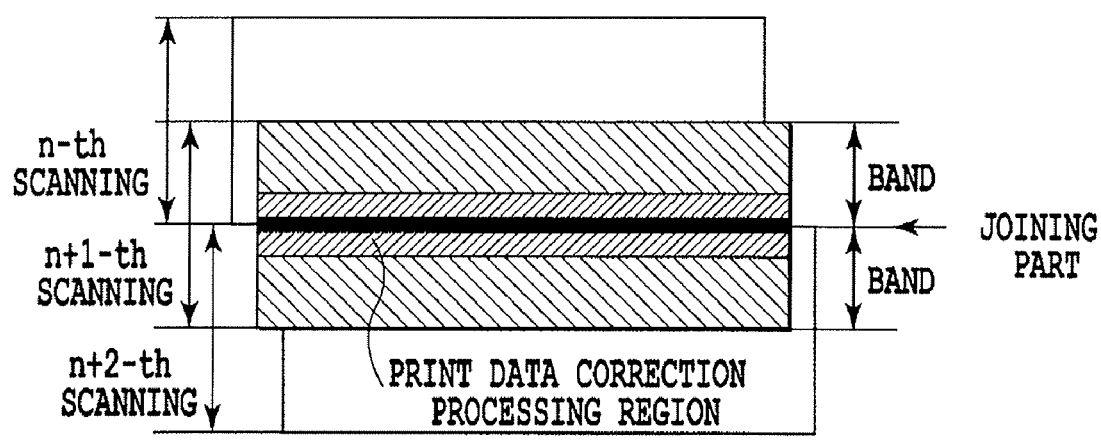
FIG. 7 is a view showing a print data correction processing region in the case of performing the two-pass printing in the first embodiment of the present invention.

FIG. 7 is a view showing a print data correction processing region in the case of performing the two-pass printing. As shown in FIG. 7, the vicinity of the joining part formed by n-th scanning and n+2-th scanning is divided into certain unit regions, dots of each ink color are counted for each region, and duty of the ink for the unit region is decided. Then, a data addition or thinning-out amount in the print data correction processing region is determined for each color from a dot count value for each region obtained by counting the dots and a relationship between a given duty of the ink and the print data addition or thinning-out processing. The print data addition or thinning-out processing is performed in accordance with the determined data addition or thinning-out amount.

The print data correction processing region is, for example, four pixels in the sub-scanning direction and all pixels in the main scanning direction, and is in the vicinity of joining part, in n+1-th scanning on the joining part. That is, the correction region in the embodiment corresponds to the four nozzles positioned at the approximate center in the nozzle arrangement line of the printing head, data for four pixels. According to the embodiment, the print data for the nozzles, which are positioned at places other than the ends in the nozzle arrangement line in the printing head for performing scanning, is corrected in the two scans forming the joining parts and another scanning. That is, the print data correction, which is addition or thinning-out of dot data, is performed corresponding to the dot duty of a predetermined vicinity of the joining part. Thus, a proper correction can be performed regardless of the end nozzle dot deflection generated for the end nozzle. It is desirable that the width of the region is larger than that of the maximum joining stripe.

Figure 8:
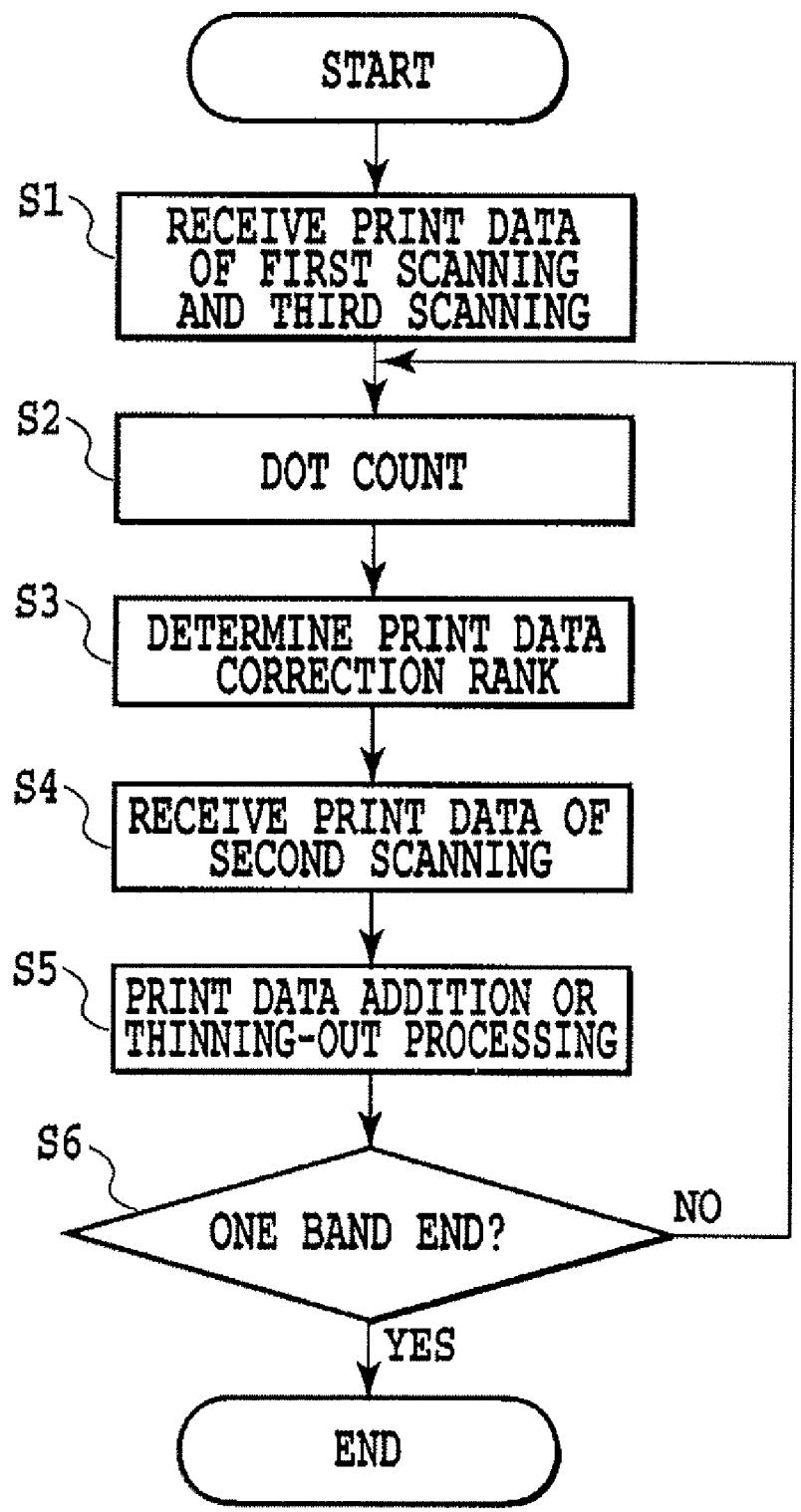
FIG. 8 is a flowchart indicating image processing performed in a host computer of the first embodiment of the present invention.

FIG. 8 is a flowchart of the image processing of the embodiment, and shows a flow from reception of the print data of the first scanning to end of print data processing in the image processing for one band. In the flowchart, a state, where binary print data is set by the scanning by a mask of the two-pass, is represented as Start.

First, the print data of the first scanning and third scanning forming the joining part is received (Step S1).

Figure 9:
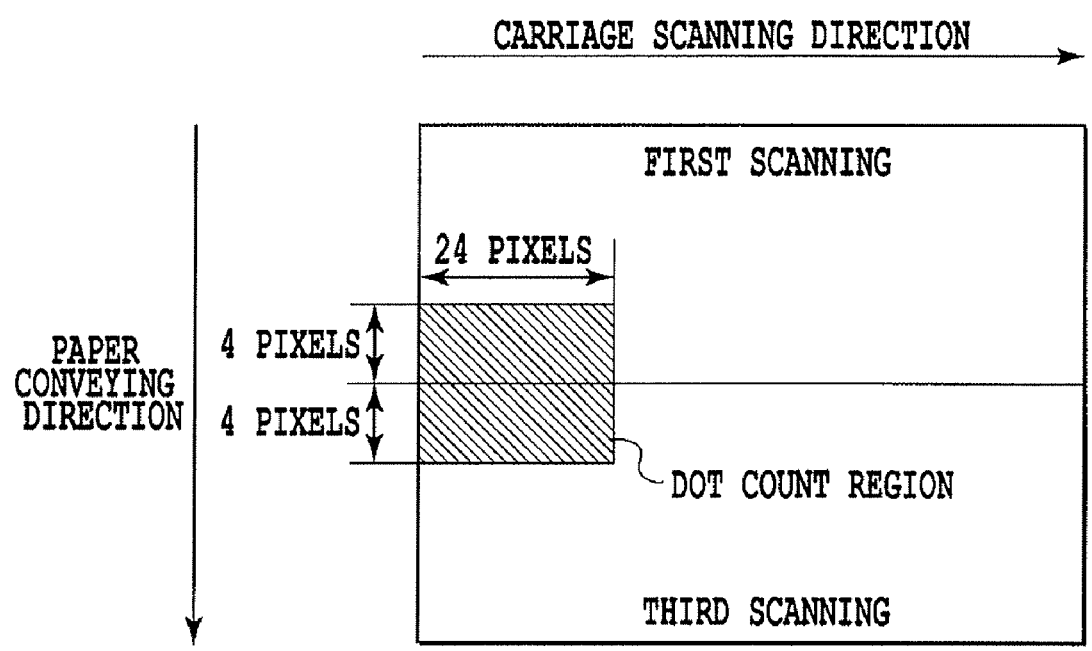
FIG. 9 is a view showing a dot count region in the case of performing the two-pass printing in the first embodiment of the present invention.

FIG. 9 is a view showing a dot count region in the case of performing the two-pass printing in the embodiment of the present invention. In Step S2, dots of the print data in the dot count region of each scanning shown in FIG. 9 are counted. The dot count indicates measuring the amount of the binary print data, and corresponds to the print duty.

As shown in FIG. 9, the region, in which the dot count is to be performed by one processing, is 4 pixels on each side of the joining part formed by the first scanning and third scanning in the sub-scanning direction, and is 24 pixels in the main scanning direction.

The dot count is performed, and thus a data correction rank is determined based on the print duty by the following method (Step S3). Then, the print data of the second scanning is received (Step S4), and the image processing such as addition or thinning-out of print data of the second scanning is performed based on the correction rank (Step S5). In the image processing, a given count value is referenced whenever the print data is received, and addition or thinning-out of print data is performed when the count value is 1, and is not performed when the count value is 0. The processing is performed by the band (Step S6), and the processing for the next band is started after the processing for the band ends. After the correction to the print data ends, printing is performed.

Figure 10:
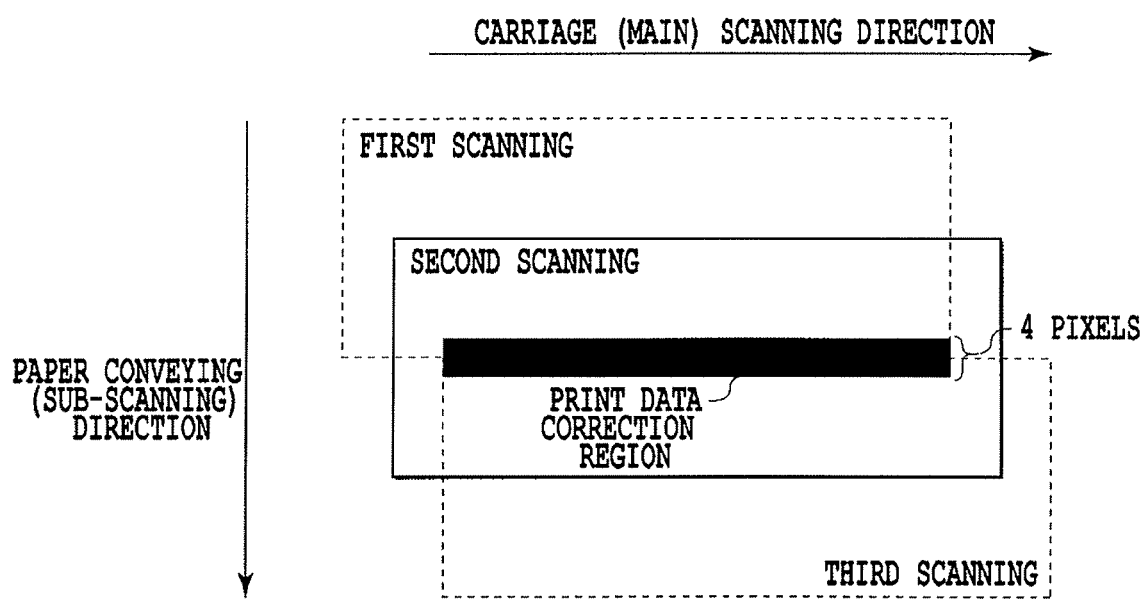
FIG. 10 is a view showing a print data correction processing region in the case of performing the two-pass printing in the first embodiment of the present invention.

FIG. 10 is a view showing a print data correction region of the second scanning. The region, in which the print data is to be corrected, is a few pixels across the joining part of the first scanning and third scanning. The correction region in the embodiment is print data for four pixels which correspond to the four nozzles, nozzle Nos. 254 to 257. Moreover, the image density of the second scanning may be increased or decreased based on the dot count value, and therefore the correction region may not be pixels corresponding to the nozzles arranged at the center part of the printing head of the second scanning. However, it is preferable that printing is performed by nozzles other than the nozzles arranged at both ends of the nozzle arrangement line.

Figure 11:
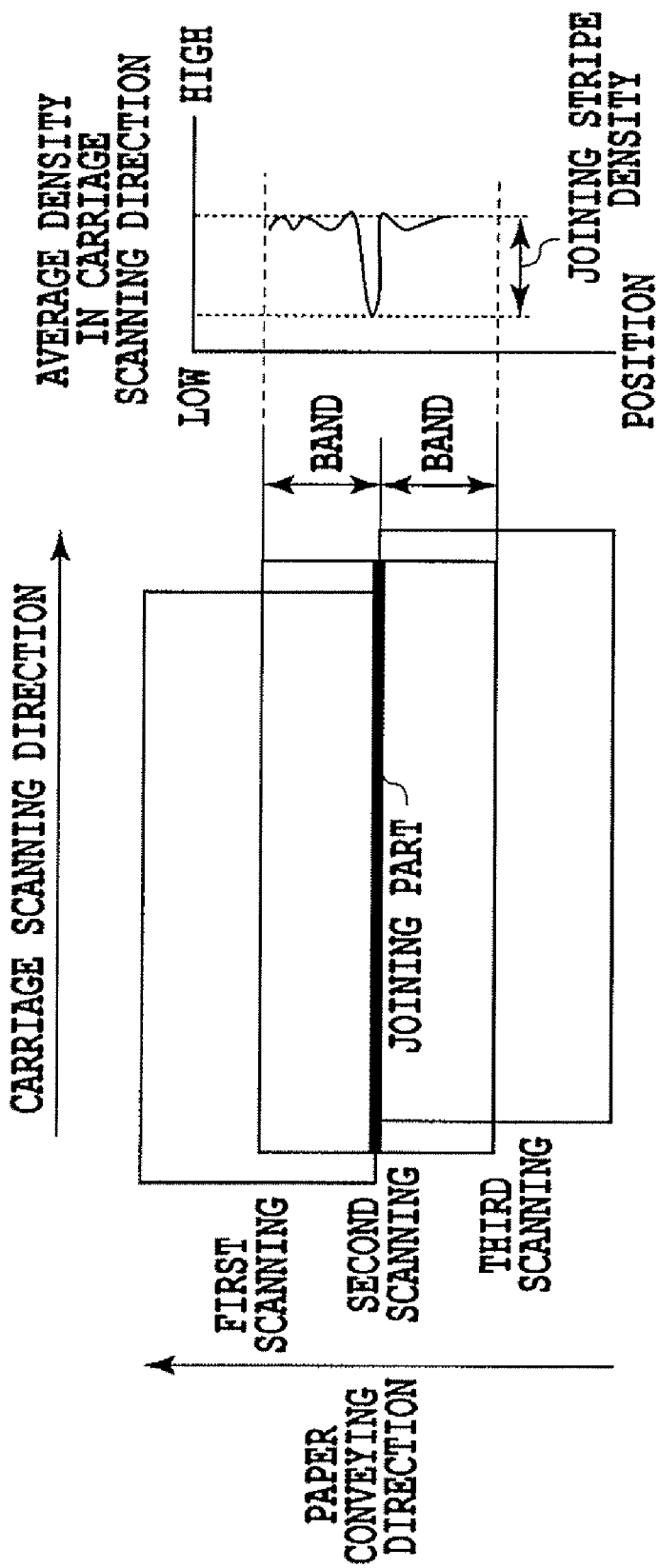
FIG. 11 is a view showing joining stripe density in the first embodiment of the present invention.

FIG. 11 is a view showing the density of the joining stripe. The joining stripe density indicates a difference between the density of the joining stripe in the carriage scanning direction and the density of the region in which the image is formed by the two scans, and thus the degrees of the joining stripe can be evaluated. When the joining stripe density is 0, no joining stripe appears. Additionally, the white stripe appears when the joining stripe density is positive, and the black stripe appears when it is negative. For example, the white stripe is shown in FIG. 11.

Figure 12:
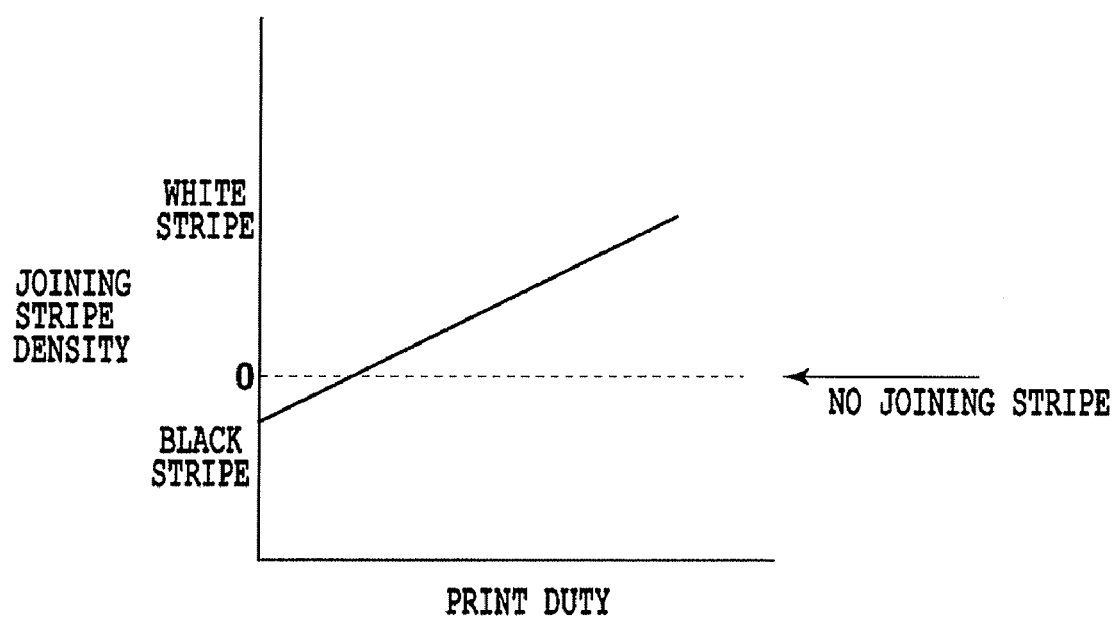
FIG. 12 is a graph indicating a relationship between print duty and the joining stripe density in the first embodiment of the present invention.

FIG. 12 is a graph indicating a relationship between the joining stripe density and the print duty. The relationship is unique to the printing apparatus, and depends on a carriage scanning speed, the print medium, the number of printing heads, the distance between the print medium and the printing head and the like. Accordingly, if the relationship between the joining stripe density and the print duty is properly grasped, the rank of the addition or thinning-out of print data can be set at high precision. The print duty and the rank of the addition or thinning-out of print data are set based on the relationship between the joining stripe density and the print duty.

Figure 13:
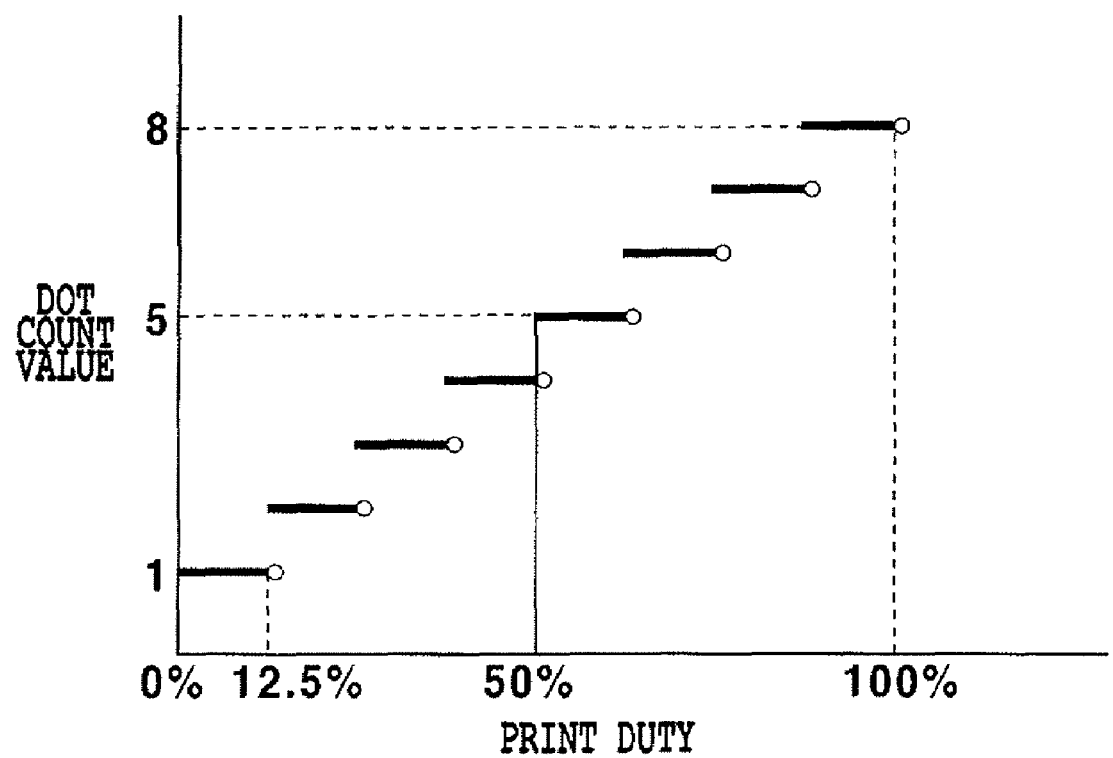
FIG. 13 is a graph indicating a relationship between the print duty and a dot count value in the first embodiment of the present invention.

FIG. 13 is a graph indicating a relationship between the print duty and the dot count value. The level of the dot count value is constituted by eight stages corresponding to the print duty. That is, the dot count value is 1 when the print duty is not less than 0% and less than 12.5%, it is 2 when the print duty is not less than 12.5% and less than 25%, and it increases one by one when the print duty increases by 12.5%. For example, when the print duty is 50%, the dot count value is 5. Moreover, although eight stages are set in the embodiment, the number of stages is not limited to eight.

Figure 14:
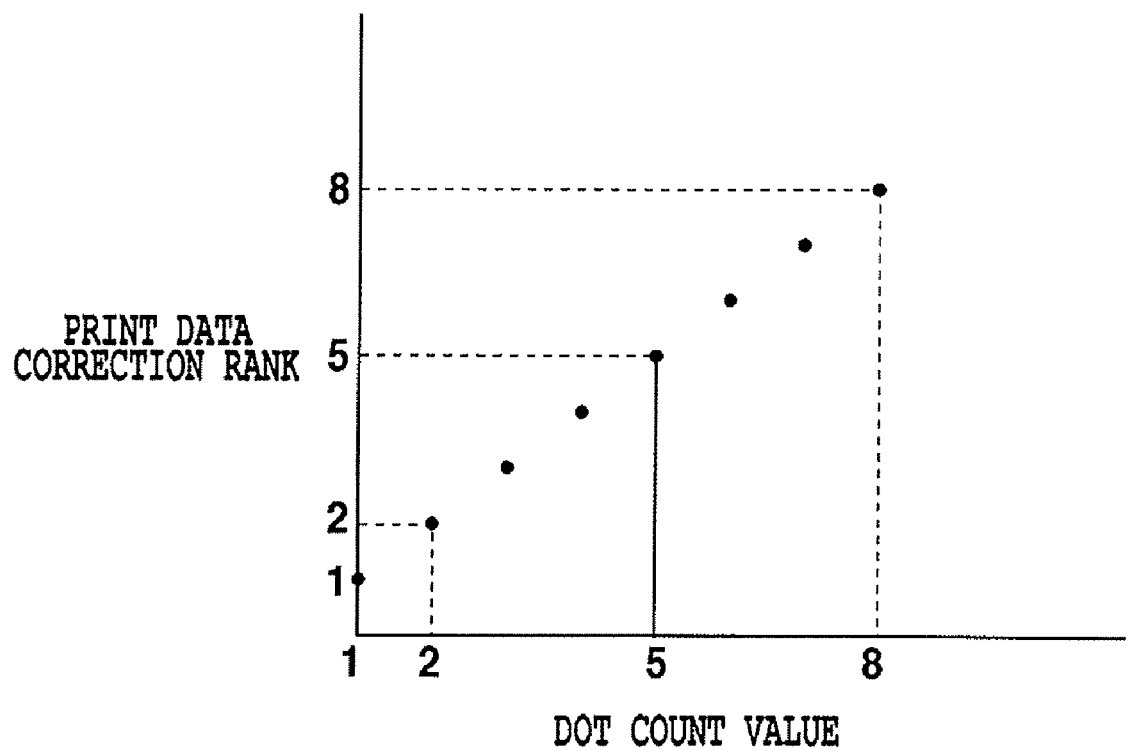
FIG. 14 is a graph indicating a relationship between the dot count value and a print data correction rank in the first embodiment of the present invention.

FIG. 14 is a graph indicating a relationship between the dot count value and the print data correction rank. Each print data correction rank is determined in advance based on the property unique to the printing apparatus shown in FIG. 12. The print data correction rank corresponds to the dot count value so that the joining stripe density becomes 0 or about 0.

Figure 15:
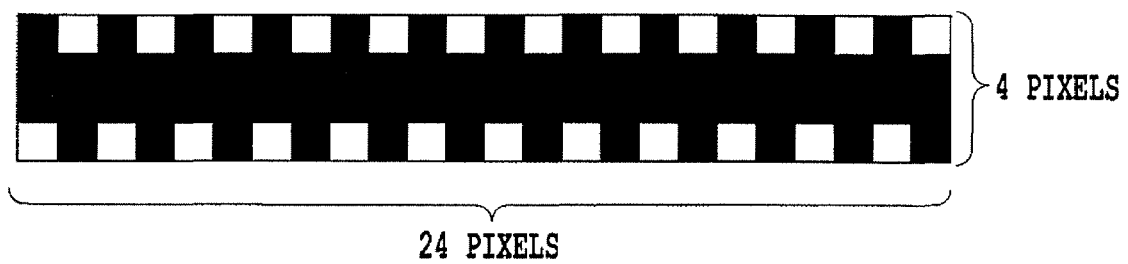
FIG. 15 is a view showing a print data correction region, in which print data is added or thinned out, in the case where the correction rank is 5 in the first embodiment of the present invention.

FIG. 15 is a view showing a print data correction region in which print data is added or thinned out in the case where the correction rank is 5. When the dot count value is 5, the print data correction rank is 5. A square represents the pixel, a black square indicates the addition of print data, and a white square indicates the thinning-out of print data. As the correction rank rises, the number of black squares increases, and as the correction rank lowers, the number of white squares increases.

All pixels are subjected to the above processing in the main scanning direction so that a high quality image having no conspicuous joining stripe can be obtained by the printing method using a small number of passes.

Moreover, although the means for adding or thinning out print data is employed in the embodiment, print density may be increased or decreased by, for example, means for increasing or decreasing the ejection amount of the ink.

Second Embodiment

Serial scanning type two-pass printing is cited in the first embodiment. However, the present invention is applicable to one-pass printing.

Figure 16:
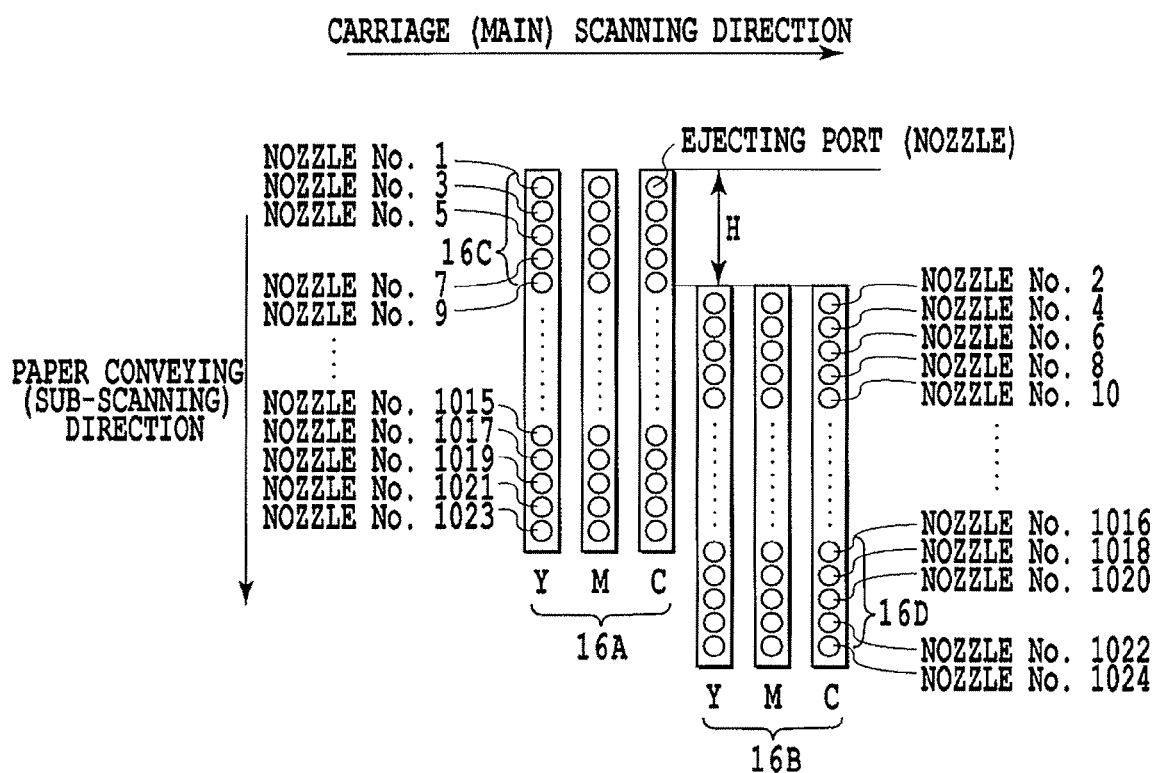
FIG. 16 is a view showing ejecting port lines of a printing head of a second embodiment of the present invention.

FIG. 16 is a view of a printing head used for the embodiment viewed from the side opposite to the print medium. The nozzle lines of yellow (Y), magenta (M), cyan (C), yellow (Y), magenta (M) and cyan (C) are arranged in the surface opposite to the print medium in the main scanning direction in this order. The three nozzle lines arranged on the left side in FIG. 16 is represented as a left line 16A, and the three nozzle lines arranged on the right side is represented as a right line 16B. The left line 16A and right line 16B are shifted from each other by a difference H in a nozzle arrangement direction. Preferably, the difference H is within the length of the ejecting port line of three pixels or more. However, the number of ejecting ports of the left line may be the same as or different from that of the right line, and the numbers of the ejecting ports in nozzle groups 16C, 16D may be different from each other. The embodiment will be described below with use of the nozzle numbers shown in FIG. 16.

Figure 17:
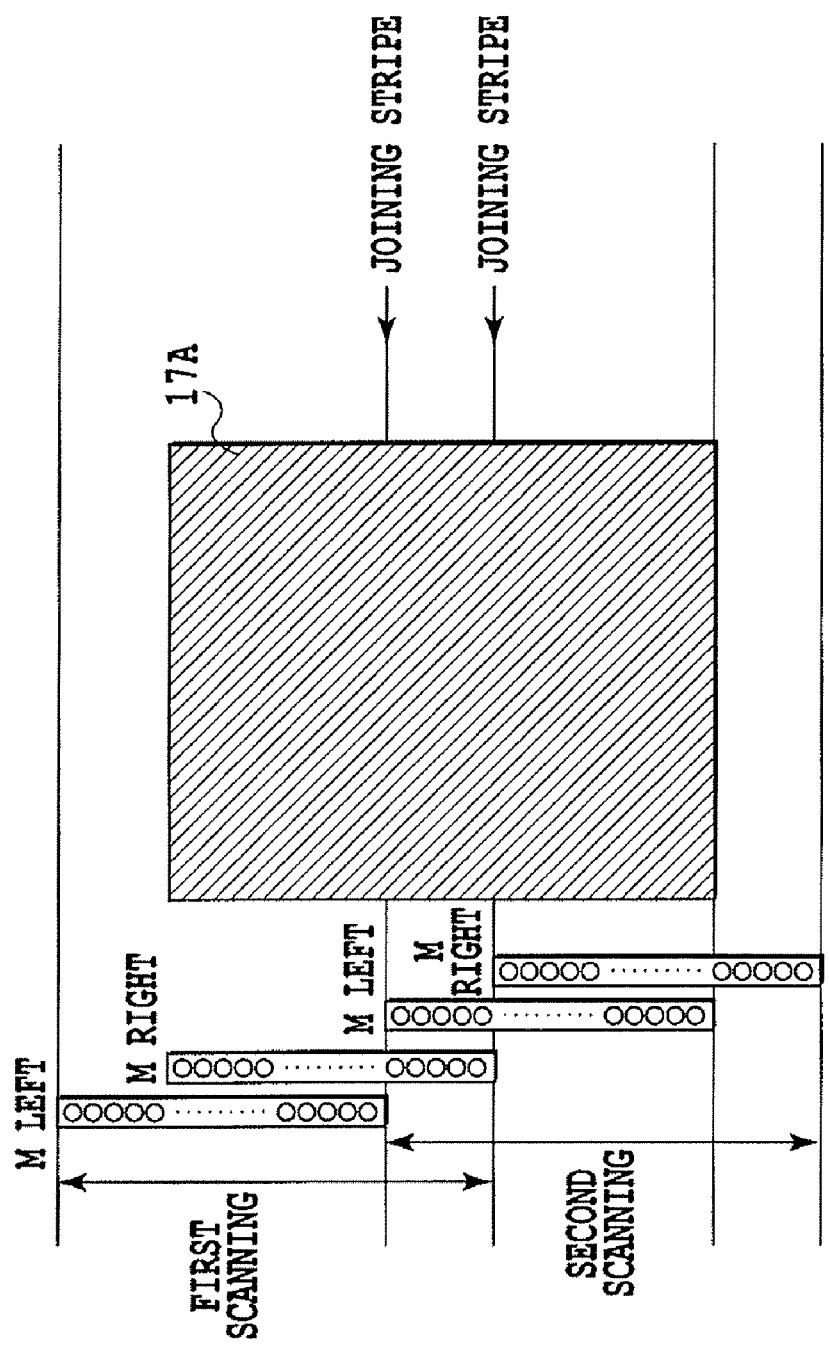
FIG. 17 is a view showing an image region in the case of performing one-pass printing in the second embodiment of the present invention.

FIG. 17 is a view showing a printed image in the case where an image is printed by one-pass printing. In FIG. 17, only the nozzle line of magenta (M) is shown, and the nozzle lines of the other colors are not shown. The reference symbol 17A denotes the printed image, and the stripe is caused by the end nozzle dot deflection of the nozzles arranged at the ends of the left line and the right line in the sub-scanning direction.

Figure 18:
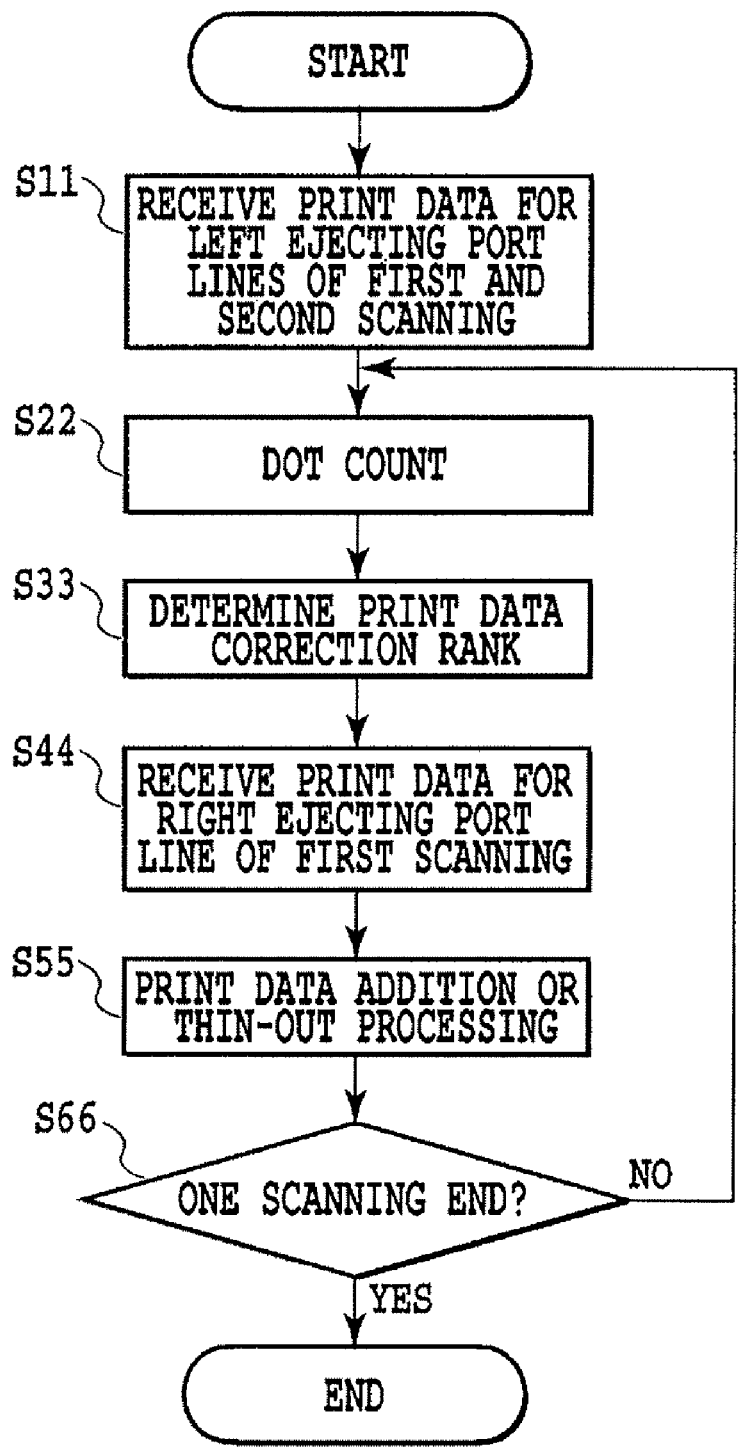
FIG. 18 is a flowchart indicating image processing performed in a host computer of the second embodiment of the present invention.

FIG. 18 is a flowchart indicating image processing of the embodiment, and indicates a flow from reception of the print data for one scanning to the end of the print data processing.

First, print data for the left lines of the first scanning and second scanning is received (Step S11). Next, the dot count is performed in a dot count region regarding the print data for left lines of the first scanning and second scanning.

Figure 19:
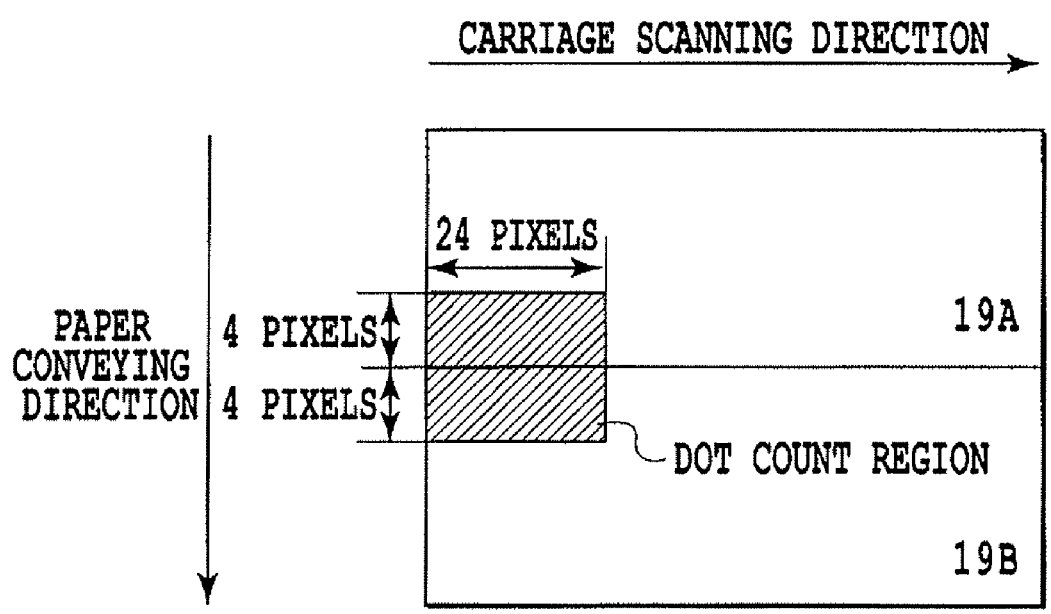
FIG. 19 is a view showing a dot count region in the case of performing the one-pass printing in the second embodiment of the present invention.

As shown in FIG. 19, the region in which the dot count is performed by one processing is 4 pixels on each side of a joining part formed by the first scanning and second scanning in the sub-scanning direction, and is 24 pixels in the main scanning direction. That is, in the sub-scanning direction, dots corresponding to ink droplets ejected from the nozzles Nos. 17, 19, 21 and 23 arranged in the left line are counted in the first scanning, and dots corresponding to ink droplets ejected from the nozzles Nos. 1, 3, 5 and 7 arranged in the left line are counted in the second scanning.

Next, the print data correction rank is determined (Step S3) like the description of the first embodiment, and the print data is corrected in the print data correction region of the right line of the first scanning. The print data for the left line and the print data for the right line are printed with thinning-out patterns different from each other so as to be complementary to each other in the printed image, and the image is printed. The nozzle group 16C is not used in the first scanning, and the nozzle group 16D is not used in the second scanning. For example, when the image shown in FIG. 17 is printed, none of the nozzles Nos. 1, 3, 5, 7 and 9 of the M left nozzle line is used in the first scanning. Additionally, none of the nozzles Nos. 1016, 1018, 1020, 1022 and 1024 of the M right nozzle line is used in the second scanning.

Print data for four pixels corresponding to ink droplets to be ejected from the nozzles Nos. 1012, 1014, 1016 and 1018 of the M right nozzle line is corrected in the first scanning. Next, print data for four pixels corresponding to ink droplets to be ejected from the nozzles Nos. 5, 7, 9 and 11 of the M left nozzle line is corrected in the second scanning.

All pixels are subjected to the above processing in the main scanning direction so that a high quality image having no conspicuous joining stripe can be obtained even in the one-pass printing. Moreover, image printing may be performed with use of the nozzle groups 16C, 16D.

Third Embodiment

The present invention is applicable to an ink jet printing apparatus provided with an ink ejecting port line having dummy nozzles.

Figure 20:
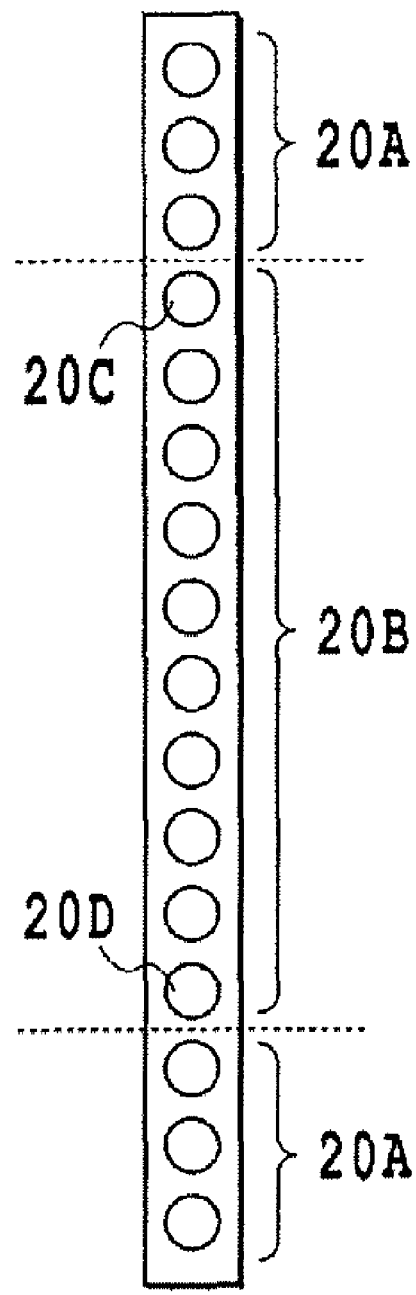
FIG. 20 is a view showing ejecting port lines of a printing head of a third embodiment of the present invention.

FIG. 20 is a view showing the ink ejecting port line having the dummy nozzles. The ejecting port line shown in FIG. 20 has 16 nozzles at the pitch corresponding to 2400 dpi. Three nozzles 20A arranged at each end are the dummy nozzles, and not used in image printing. For example, in the ink jet printing apparatus, when the ink jet printing head is heated by a heater for ejecting the ink, the temperature of the end nozzles is sometimes raised. In this case, an ink head is sometimes used in which the dummy nozzles are arranged at both ends thereof.

The present invention is applicable to such a printing head. That is, although a stripe is sometimes caused between an image printed with ink ejected from an ink nozzle 20D in the first scanning and an image printed with ink ejected from an ink nozzle 20C, the present invention is applicable to this case.

[Other]

The present invention has an excellent effect on a printing apparatus provided with a printing head employing a method for changing a state of the ink by the thermal energy and ejecting the ink, the method being especially selected from ink jet printing methods. According to the method, high-density printing and high-precision printing can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-170462, filed Jun. 20, 2006, which is hereby incorporated by reference herein in its entirety.

What is claimed is:

1. An image processing method for generating print data for an ink jet printing apparatus, which performs printing by making a printing head having a plurality of nozzles for ejecting ink scan a print medium, and ejecting an ink droplet from the printing head onto the print medium to form dots, said method comprising:

a step of, based on print data for each of two scans forming image print regions adjacent to each other, obtaining information on a forming amount of dots which is indicated by print data corresponding to a predetermined region including a boundary between the image print regions adjacent to each other; and a step of correcting print data, which corresponds to a vicinity region of the boundary, of the print data for a different scan from the two scans, based on the information obtained in said obtaining step.

2. The image processing method according to claim 1, wherein the information on the forming amount of dots is information showing a number of forming dots.

3. The image processing method according to claim 1, wherein the vicinity region is included in the predetermined region and is smaller than the predetermined region.

4. An ink jet printing apparatus for generating print data for an ink jet printing apparatus, which performs printing by making a printing head having a plurality of nozzles for ejecting ink scan a print medium, and ejecting an ink droplet from the printing head onto the print medium to form dots, comprising:

an obtaining unit configured to, based on print data for each of two scans forming image print regions adjacent to each other, obtain information on a forming amount of dots which is indicated by print data corresponding to a predetermined region including a boundary between the image print regions adjacent to each other; and a correcting unit configured to correct print data, which corresponds to a vicinity region of the boundary, of the print data for a different scan from the two scans, based on the information obtained by said obtaining unit.

5. The ink jet printing apparatus according to claim 4, wherein the vicinity region is included in the predetermined region and is smaller than the predetermined region.

6. The ink jet printing apparatus according to claim 4, wherein the information on the forming amount of dots is information showing a number of forming dots.

* * * * *